United States Patent

[11] 3,566,039

[72] Inventors George W. Saunders
Cooksville, Ontario;
Robert E. Hartlen, Brampton, Ontario, Canada
[21] Appl. No. 689,565
[22] Filed Dec. 11, 1967
[45] Patented Feb. 23, 1971
[73] Assignee Northern Electric Company, Limited
Montreal, Quebec, Canada

[54] APPARATUS FOR SUPPLYING REVERTIVE RINGING TO A MULTI-PARTY TELEPHONE LINE
2 Claims, 2 Drawing Figs.

[52] U.S. Cl. .......... 179/17
[51] Int. Cl. .......... H09m 13/00
[50] Field of Search .......... 179/17, 17.5, 17.6

[56] References Cited

UNITED STATES PATENTS 2,595,944 5/1952 R. E. Hersey .......... 179/17

OTHER REFERENCES

" Ringing Selection in No. 5 Cross bar" , Goddard, M.C., Bell Laboratories Record, April, 1950, p. 168

*Primary Examiner*—Kathleen H. Claffy
*Assistant Examiner*—Jan S. Black
*Attorney*—Curphey & Erickson

ABSTRACT: This invention relates to the application of reverting ringing to a multiparty telephone line. In accordance with the invention, the ringing selection switch automatically applies coded ringing signals to the side of the line on which the called party if located and revertive ringing signals to the other side of the line.

In a preferred embodiment of the invention the ringing selection switch is a crossbar switch having horizontal and vertical paths with point of contacts with each other. Each vertical path comprises a plurality of wires, one of which having contacts for connection to the source of ringing signals and a second one of which having contacts for connection to the source of revertive ringing signals. The wires have two additional contacts which are selectively operated for connecting the source of ringing signals to one side of the line and the source of revertive ringing signals to the other side of the line.

*INVENTORS*
G.W. SAUNDERS
R.E.HARTLEN
AGENTS
Curphey & Erickson

*INVENTORS*
G.W. SAUNDERS
R.E. HARTLEN

AGENTS
Curphey & Erickson

APPARATUS FOR SUPPLYING REVERTIVE RINGING TO A MULTI-PARTY TELEPHONE LINE

This invention relates to telephone reverting call systems and more particularly to means for supplying revertive ringing to a calling subscriber located on the same party line as the called subscriber.

In accordance with a well-known method, ringing is applied to the called party while revertive ringing is sent to the calling party, when he hangs up, so that he will know when the ringing is tripped, that the called party has answered. Formerly, ringing was applied to the called party by means of the ringing selection switch and revertive ringing was applied to the calling party by means of the revertive trunk. However, in order to apply revertive ringing to the right side of the line, the revertive trunk had to have special equipment to know which party was on which side of the line. This extra equipment added to the complexity and to the cost of the revertive trunk.

It is the main feature of the present invention to provide revertive ringing to a calling party located on the same line as the called party by means which automatically recognizes which party is on which side of the line without the need of extra equipment in the revertive trunk circuit.

In accordance with the invention, both ringing signals and revertive ringing signals are supplied by the ringing selection switch. By using the same equipment for supplying both the ringing to the called party and the revertive ringing to the calling party there is no need for special equipment in the revertive trunk to recognize which party is on which side of the line. The ringing selection switch automatically applies ringing signals to the side of the line that the called party is located, and revertive ringing signals to the other side of the line.

In a preferred embodiment of the invention the ringing selection switch is a crossbar switch having horizontal and vertical paths with points of contact with each other forming crosspoints. Each vertical path comprises a plurality of wires, one of which having contacts for connection to the source of coded ringing signals and a second one of which having contacts for connection to the source of revertive ringing signals. The wires have two additional contacts which are selectively operated for connecting the source of ringing signals to one side of the line and the source of revertive ringing signals to the other side of the line.

The invention will now be described with reference to the following drawings in which.

Figure 1:
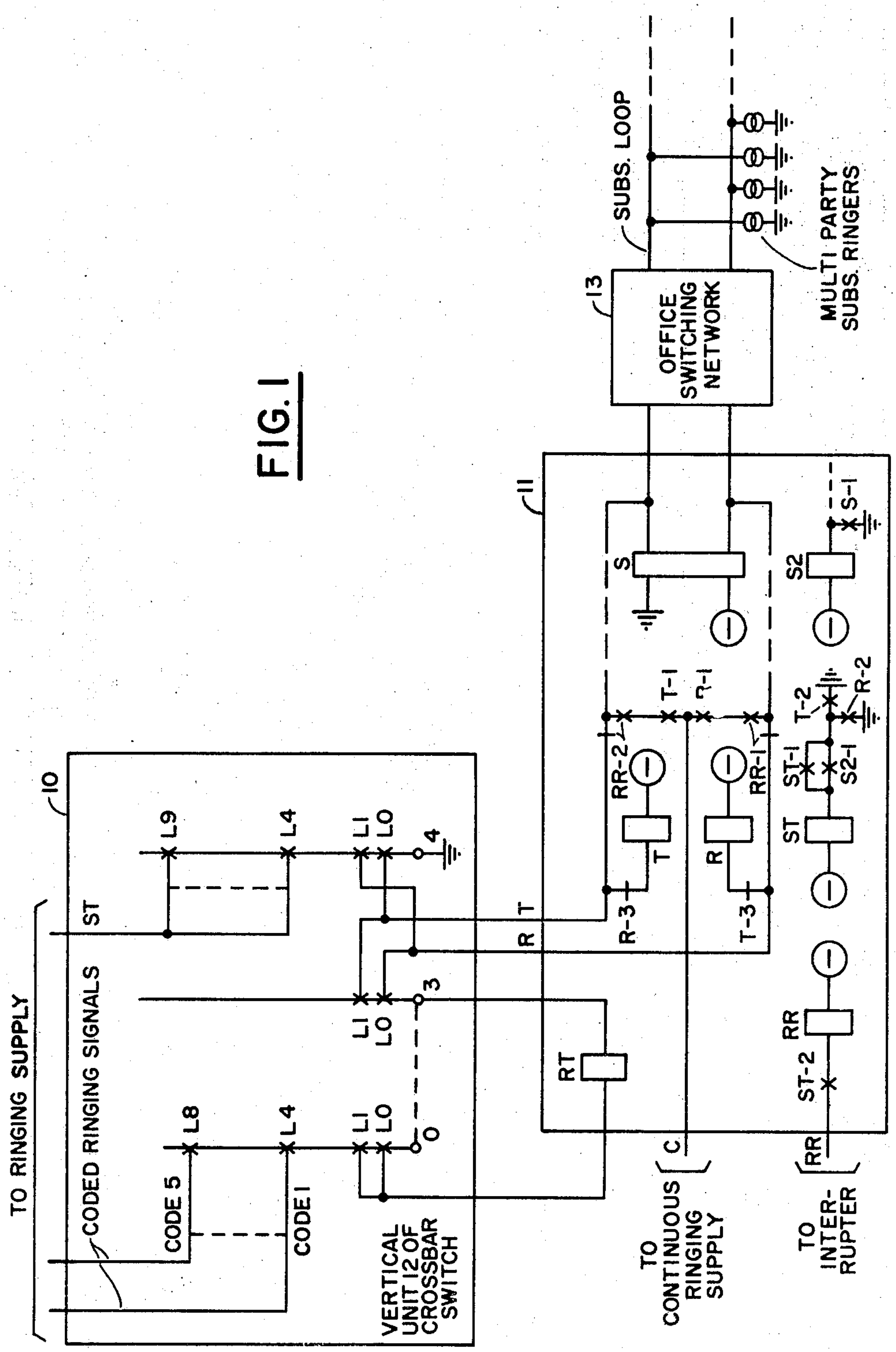
FIG. 1 is an apparatus for supplying ringing signals to party line in accordance with the prior art.

FIG. 1 of the drawings illustrates the pertinent parts of known circuit involved in the ringing to a two-party or a multiparty subscriber's line. Portions of the ringing selection switch 10 and the revertive trunk 11 which control the application of the coded ringing and revertive ringing to the called and calling subscribers respectively are illustrated. The ringing selection switch 10 is a crossbar switch of a type well known in the art and having a plurality of horizontal and vertical paths. Any horizontal path can be connected to any vertical path by means of horizontal and vertical magnets commonly known as hold and select magnets. The points of contacts of the connections are known as crosspoints and are illustrated by references L0—L9. Only one vertical unit 12 forming one vertical path of the crossbar switch is illustrated. Six-wire vertical unit crossbar switches are used for ringing selection switches but vertical unit 12 shows three only, namely wires 0, 3 and 4, the others being used to perform functions which are not related to the present invention. As illustrated, crosspoints L4—L8 connect the ringing supply which provides coded ringing signals to wire 0 and crosspoints LO and L1 connect wires 0, 3 and 4 to reverting trunk 11. In addition crosspoints L4—L9 also connect wire 4 to lead ST of the ringing supply.

One function of revertive trunk 11 as illustrated in FIG. 1 of the drawings is to interconnect the ringing selection switch and a multiparty subscriber loop through an office switching network 13 for providing proper ringing. It comprises various components of which only the ones directly related to the invention are shown. These components are a revertive ringing relay RR connected to an interrupter circuit; a tip and ring relay T and R respectively for identifying which party is on which side of the line as will be explained later; and a ring trip relay RT for stopping the ringing supply when the called party answers as commonly known in the art. In addition, relays S, S2 and ST are used in a supervisory capacity in the trunk.

When a revertive call is to be served two select magnets in the ringing selection switch 10 will be operated as determined by the controlling equipment which may be, for example, the marker of the well-known crossbar system. One magnet operates contacts L0 or L1 depending on whether the called party is a tip or ring party, and the other operated magnet closes one of five crosspoints L4—L8 to provide the required coded ringing signals.

It may be useful to point out here that the various parties of a multiparty line are connected to either the tip or the ring lead, and that they are signalled by different coded signals such as two short bursts or a long burst followed by a short burst, etc. In addition, the side opposite the called line normally receives revertive ringing bursts which consist of two ½ second bursts and a 6-second ringing cycle to advise the calling party when the called party has answered.

As an example, let us take the case where the called party is located on the tip side of the subscriber's loop and the particular ringing code is code 5. Let us also assume that the calling party is on the ring side of the same line. Crosspoints L1 and L8 will be operated. Ground on wire 4 will pass through crosspoints L1 and L8 and out on the ST lead to start the ringing machine.

Code 5 ringing current will then pass through to the crosspoint L8, wire 0, crosspoint L1, the RT relay of revertive trunk 11, back to wire 3, crosspoint L1 and back to the revertive trunk 11 on the T lead and out to the subscriber's loop through the office switching network 13. The ringers connected to the T lead will then ring.

At the same time, ground is applied to the R lead of the revertive trunk from wire 4 and crosspoint L1. This ground operates relay R. Relays S and S2 are operated as soon as the loop through the subscriber's loop, the office switching network and the trunk is established by means of the controlling equipment. With relays R and S2 operated, relay ST operates through contacts R-2 and S2-1 and locks operated through contact ST-1. Relay RR operates through contact ST-2 of relay ST each time a ground is placed on the RR lead by the interrupter circuit which applies a ground twice for one-half second in a 6-second ringing cycle. The continuous ringing signal placed on the C lead from the ringing circuit now passes through contacts R-1 of relay R and RR-1 of relay RR and out on the ring lead of the subscriber's loop. This continuous ringing signal will become an interrupted ringing (called revertive ringing) signal because it can only be applied to the line during the ½second intervals that the RR relay is operated. It is the combination of the R and RR relay in the revertive trunk which applies revertive ringing to the R lead of the line.

When the called party is a ring party, crosspoint L0 is operated instead of L1 to apply the coded ringing signals to the R lead and ground to the T lead thereby energizing relay T. The energization of relay T in combination with the operation of relay RR applies revertive ringing to lead T where the calling party is located.

From the above, it is clearly seen that revertive ringing is controlled by the revertive trunk and and that such requires the use of relays RR, T and R and their associated contacts. Relays T and R are required to permit the revertive trunk 11 to identify whether the calling party is a ring or a tip party and relay RR is necessary to supply the revertive ringing signals.

Figure 2:
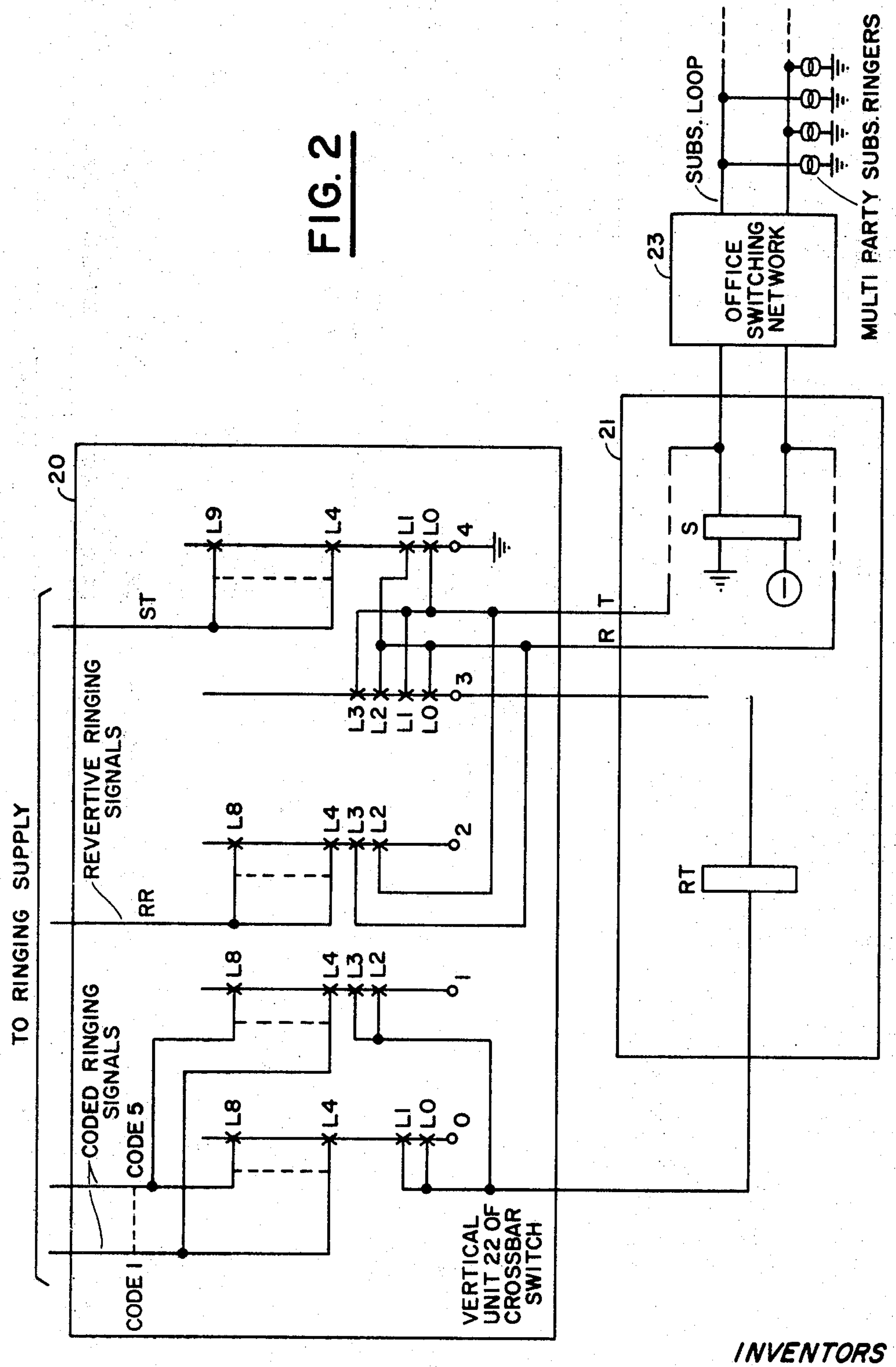
FIG. 2 is an apparatus for supplying ringing signals to party line subscribers in accordance with the invention.

Referring now to FIG. 2, which illustrates a system in accordance with the present invention, there is shown a ringing selection switch 20 arranged for providing both coded ringing signals and revertive ringing signals to the subscriber's loop so as to simplify the revertive trunk 21 by eliminating relays RR, R and T which appeared in revertive trunk 11 of FIG. 1. Ringing selection switch 20 is of the crossbar type and comprises a plurality of horizontal and vertical paths having crosspoints L0—L9. Only one vertical unit 22 is illustrated, such unit having six wires of which wires 0—4 only are shown, the other wire being used to perform a function which is not relevant to the present invention.

As illustrated in FIG. 2 of the drawings crosspoints L4—L8 of wires 0, 1, 2 and 4 are connected to a ringing supply which now supplies coded ringing to wires 0 and 1, and, revertive ringing to wire 2. Wire 4 with its ground and crosspoints is again used to start the ringing machine. In addition, crosspoints L0 and L1 of wires 0 and 4, crosspoints L2 and L3 of wires 1 and 2 and crosspoints L0—L3 of wire 3 are connected to revertive trunk 21. The horizontal paths of crosspoints L2 and L3 of wire 2 are cross-connected to the horizontal paths of crosspoints L3 and L2 respectively of wire 3.

Crosspoints L0 or L1 of wires 0, 3 and 4 are used for handling code ringing to subscribers not requiring revertive ringing. When revertive ringing is required, crosspoints L2 or L3 of wires 1, 2 and 3 are operated. The operation of one crosspoint L4—L8 and either L2 or L3 in wire 1 will supply coded ringing signals to the side of the line the called party is located and the operation of the same crosspoints in wire 2 will supply revertive ringing signals to the opposite side of the line.

As an example, let us take again the case where the called party is a tip party and the particular code of ringing required is code 5. Crosspoints L3 and L8 are operated by the controlling equipment in the same way as it was mentioned previously in connection with the description of FIG. 1. Code 5 ringing current will flow through crosspoints L8 and L3 of wire 1 through relay RT of revertive trunk 21, back to crosspoint L3 of wire 3, out to lead T of revertive trunk 21 and out to the tip party ringers by means of the office switching network 23. The revertive ringing will be applied to the ring lead R of the subscriber's loop directly by the ringing selection switch through crosspoints L8 and L3 of wire 2. This way the ringing selection switch provides both coded ringing and revertive ringing and the revertive trunk is made simpler in that it no longer needs relays R and T to identify whether the called party is tip or ring, and also does not require relay RR to supply the revertive ringing signals.

When the called party is a ring party, crosspoint L2 is operated instead of L3 to apply revertive ringing to the tip side of the line and the coded ringing signals to the ring side of the line.

We claim:

1. An apparatus for supplying ringing signals to party line subscribers connected to opposite sides of the same telephone line comprising:

a. a ringing supply comprising a source of coded ringing signals and a source of revertive ringing signals, b. a ringing selection switch connected between the ringing supply and the telephone line and adapted to selectively supply coded ringing signals to the called subscriber connected to one side of the telephone line and revertive ringing signals to the calling subscriber connected to the other side of the telephone line.

2. An apparatus as defined in claim 1 wherein said selection switch comprises a crossbar switch having a plurality of horizontal and vertical paths having points of contact with each other forming crosspoints and wherein each vertical path comprises, a first wire having crosspoints for connection to said source of coded ringing signals, a second wire having crosspoints for connection to said source of revertive ringing signals, a third wire, and wherein, said first, second and third wires each has corresponding additional first and second crosspoints, the third wire being connected to said source of coded ringing signals through both said first and second crosspoints of said first wire, and the horizontal path connecting said first and second crosspoints of the second and third wires being cross-connected, and connected to opposite sides of the telephone line such that the operation of either all said first or all said second crosspoints will supply coded ringing signals to the side of the telephone line to which the called party is connected and revertive ringing signals to the other side of said line.